United States Patent
Bedi et al.

(10) Patent No.: US 11,449,662 B2
(45) Date of Patent: Sep. 20, 2022

(54) AUTOMATIC GENERATION OF LAYOUT VARIATIONS BASED ON VISUAL FLOW

(71) Applicant: ADOBE INC., San Jose, CA (US)

(72) Inventors: Amish Kumar Bedi, Ropar (IN); Damanpreet Kaur, Jalandhar (IN); Sanyam Jain, New Delhi (IN); Zoya Bylinskii, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/068,623

(22) Filed: Oct. 12, 2020

(65) Prior Publication Data

US 2022/0114326 A1  Apr. 14, 2022

(51) Int. Cl.
*G06F 17/00* (2019.01)
*G06F 40/106* (2020.01)
*G06F 40/186* (2020.01)

(52) U.S. Cl.
CPC .......... *G06F 40/106* (2020.01); *G06F 40/186* (2020.01)

(58) Field of Classification Search
CPC .... G06F 40/106; G06F 40/186; G06F 3/0488; G06F 3/0482; G06F 3/048; G06F 2203/04803; G06K 9/6256; H04N 5/23212; H04N 9/735; G06N 3/0454
USPC ........................................................ 715/234
See application file for complete search history.

(56) References Cited

U.S. PATENT DOCUMENTS

| | | | |
|---|---|---|---|
| 2013/0263280 A1* | 10/2013 | Cote | H04L 63/1433 726/26 |
| 2016/0188161 A1* | 6/2016 | Toussaint | G06F 3/0486 715/765 |
| 2020/0380289 A1* | 12/2020 | Jagadeesh | G06K 9/6256 |
| 2021/0089175 A1* | 3/2021 | Mani | G06K 9/623 |

* cited by examiner

*Primary Examiner* — Jason T Edwards
(74) *Attorney, Agent, or Firm* — Shook, Hardy & Bacon L.L.P.

(57) ABSTRACT

This disclosure includes technologies for image processing, specifically for generating layout variations that are different but visually consistent with the input layout. The disclosed system determines a visual flow of the design blocks in the input layout, and then generates layout variations based on the visual flow. Advantageously, the disclosed technologies enable both novices and seasoned designers to efficiently create alternative layout variations, even in real-time with intricate designs.

14 Claims, 7 Drawing Sheets

AUTOMATIC GENERATION OF LAYOUT VARIATIONS BASED ON VISUAL FLOW

BACKGROUND

Desktop publishing has the potential to replace traditional print publishing. Nowadays, it is convenient to create various forms of online content or documents using desktop publishing software, which can generate layouts and produce typographic-quality text and images. Graphic design professionals may also refer to desktop publishing software as page layout software or image editing software. Prominent desktop publishing software includes Adobe Dreamweaver, which is a popular tool that facilitates the creation of webpages and dynamic internet content; Adobe Illustrator, which allows graphic designers to manipulate vector graphics; Adobe InDesign, which specialized for layout and design manipulation; and Adobe Photoshop, which represent the de facto standard for image editing.

Page layout or layout refers to the arrangement of visual elements on a page, e.g., a webpage or a poster. Layout design involves decisions on the composition and the organization of visual elements to achieve the intended communication objectives. Layout design, similar to architectural design, requires creativity, intelligence, sentience, awareness, and intensive labor with many trials to achieve the desired outcome.

To redesign layouts for mediums or devices with different sizes, designers conventionally have to cater to different sizes individually. Even if the layouts share the same content, the designer typically has to create new designs from scratch using the same design elements for different layout sizes. This manual approach is labor-intensive. On the other hand, some desktop publishing tools can slightly alleviate designers' burdens, such as to help designers increase or decrease the size of an element on a different layout. However, those conventional tools lack solutions for creating new layouts.

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

In general, this disclosure includes a technical solution for generating, based on the visual flow of the input layout, an output layout, and its variations thereof. In various embodiments, the disclosed system identifies design blocks in the input layout, determines the visual flow of the design blocks, selects patterns for the output layouts, allots pattern sections to the design blocks, and transforms the design blocks into allotted pattern sections. In some embodiments, the disclosed system may further evaluate the output layout variations and provide the users with top-ranked output layout variations.

Furthermore, various systems, methods, and computer-readable storage devices are disclosed to improve a computing system's function for image processing in various aspects. Specifically, one technical purpose is to generate layout variations or image variations automatically. Among the many aspects of technical characters described herein to serve the aforementioned technical purpose, one aspect of the technical characters includes determining the visual flow of the design blocks in the input layout based on a pixel-wise saliency heatmap, adjusting output patterns based on the visual flow, and transforming design blocks into the selected patterns based on the visual flow. Resultantly, these technical characters induce further technical effects, including generating layout/image variations based on the visual flow and causing the constraint relationships and relative positioning of various design elements in an output layout to be different yet consistent with the input layout. Various other improvements over conventional image processing systems are further discussed in the Detailed Description.

BRIEF DESCRIPTION OF THE DRAWINGS

The technologies described herein are illustrated by way of example and not limited by the accompanying figures in which like reference numerals indicate similar elements and in which.

DETAILED DESCRIPTION

The various technologies described herein are set forth with sufficient specificity to meet statutory requirements. However, the description itself is not intended to limit the scope of this disclosure. Instead, the inventors have contemplated that the claimed subject matter might also be embodied in other ways, to include different steps or combinations of steps similar to the ones described in this document, in conjunction with other present or future technologies. Moreover, although the terms "step" or "block" may be used herein to connote different elements of methods employed, the terms should not be interpreted as implying any particular order among or between various steps herein disclosed unless and except when the order of individual steps is explicitly described. Further, the term "based on" generally denotes that the succedent object, data, or information is used in performing the precedent action.

In the last decade, there has been an explosion of different screen sizes, on which digital design content is consumed. Resultantly, graphic designers have to design graphic layouts for multiple layout sizes to function across various mediums and devices. In the domain of graphic design, layout refers to the arrangement of visual elements on a page, such as a webpage or a poster. Layout design involves decisions on the composition and the organization of the visual elements to achieve the intended communication objectives. Layout design requires creativity, intelligence, sentience, awareness, and often, intensive labor with many trials to achieve the desired outcome.

To design layouts for mediums or devices with different sizes, designers typically have to cater to different sizes individually using various digital publishing tools. Even if the layouts share the same content, the designer typically has to create a new design from scratch using the same design elements based on the different layout sizes. By way of example, if a designer is tasked to create an alternative layout with different size from an existing layout, the designer currently can create the alternative layout manually or, at the most, leverage from some semi-automated tools, e.g., to increase or decrease the size of the elements on a different layout.

The current solution for the designers to treat each layout variation as a new design assignment and manually create all the variations separately is time-consuming and inefficient. The existing solutions for the designers to use some semi-automated tools to place objects on layout variation are generally problematic. However, semi-automated tools have limited functions and may only accomplish a small portion (e.g., 10-20%) of the required work for generating a new layout variation. Those semi-automated tools focus on resizing or rescaling objects and would not reflow items inside the new layout. By way of example, a known popular tool generates a new layout by merely changing the size proportions while keeping the top-left coordinate of the objects fixed. Designers understand that layout variations would be limited based mostly on rescaling or resizing without reflowing.

Similarly, those semi-automated tools typically cannot automatically adjust objects' relative positions or positions with respect to the layout board. Resultantly, designers still need to manually complete the remaining majority portion of the required work, e.g., to fix the positioning of the item boxes and their content fitting. Further, the output layouts generated from conventional tools can be unexpected, especially when the output layouts have multiple constraints. In summary, with traditional systems or technologies, it is challenging and time-consuming for designers to adapt their designs to different mediums or devices. Accordingly, designers desire a technical solution to automatically generate different graphic designs, e.g., with varying sizes.

Given an input layout and a target layout size, this disclosed system aims to create different layout variations with the target layout size based on the design elements extracted from the input layout. Specifically, the disclosed technical solution enables the automatic generation of the output design variations based on the visual flow of design blocks in the input layout. Accordingly, the disclosed technologies allow designers to reproduce layout variations as needed for different mediums or devices in a fast and efficient manner.

An exemplary process for generating layout variations include several stages. First, the process is to identify design blocks. If a layout has a large number of design elements, the complexity to handle individual element's transformation in the layout variations can be too high. In various embodiments, to maintain a predictable and manageable complexity level, the process divides design elements in the graphic design into design blocks, with each block containing one or more semantically related elements. This stage is further discussed with FIGS. 1, 2, and 6.

Second, the process determines the visual flow of the design blocks. In some embodiments, visual flow refers to the decreasing order of the visual importance of various design blocks in layout design. In various embodiments, a saliency prediction model is used to generate the saliency heatmap (also referred to as "heatmap") of the image rendition of graphic layout design. The heatmap indicates pixel-wise saliency of the layout. The visual importance score of a design block may then be determined based on the pixels within the design block and the heatmap. Accordingly, the design blocks in the layout may be ranked or sorted based on their visual importance scores. In other words, the visual flow can be determined by traversing all design blocks in the decreasing order based on their ranks. This stage is further discussed with FIGS. 1, 2, 5, and 6.

Third, the process selects a pattern and transforms the design blocks into the pattern based on the visual flow. Based on the layout output size and the count of design blocks, the system can generate many design patterns in which those design blocks can fit. Next, the system may allot respective sections in a pattern to those design blocks. Since there are potentially many allotment variations, optionally, the system may prune the allotment variations and select a finite list of allotted patterns to generate the layout variations. Next, the system will transform each design block into its allotted section of an allotted pattern. The transformation may involve resizing, rescaling, repositioning, and reflowing of various elements in a design block. Resultantly, various layout variations are generated after the transformation step. This stage is further discussed with FIGS. 1, 3, 5, and 6.

Fourth, in some embodiments, the process evaluates layout variations and only output one or more highly ranked layout variations according to various criteria, e.g., as discussed in connection with block 670 of FIG. 6.

Advantageously, the disclosed technical solution enables designers to automatically create a new variation of the input layout in a required layout size, while keeping the design flow and design essence intact. The output layout size can be the same as or different from the size of the input layout. Designers can then choose a layout from the automatically generated layout variations and perform additional edits on the layout if needed. In short, the disclosed technologies provide designers with a powerful function to automatically generate different sized layout variations needed for various mediums and devices.

This solution for automatically generating layout variations can run in real-time and can deal with complicated designs with a large number of elements. With conventional technologies, a designer may have to manually redesign a layout variation, where the increase in the number of design elements would significantly complicate such redesign projects. With the disclosed technologies, the disclosed system automatically handles the constraint relationships and the relative positioning of the different design elements. Particularly, to manage intricate designs, the disclosed system breaks down a layout into design blocks and then handles individual blocks for better granular arrangements. Further, the disclosed solution can also be recursively applied on the extracted design blocks to generate different variations of that block comprising of complex elements.

The disclosed solution focuses on the dimensions and the layout semantics to create layout variations, e.g., based on the visual flow of the design blocks. The disclosed system empowers designers to quickly create multiple-sized layout variations based on the same set of graphic design elements. Further, the disclosed system can select the best layout variations that are consistent with the input layout aesthetics, such as those layout variations with consistent arrangements of design elements in terms of the visual flow of the design blocks. Even further, the disclosed system generates a layout variation not only by repositioning or rescaling of the design elements but also reflowing selected design elements, including both text and graphic elements. Accordingly, designers would appreciate the generated layout variations for maintaining the overall design theme and aesthetics associated with the input layout.

Additionally, the disclosed technologies are generally applicable to many types or categories of graphic design documents. Accordingly, the disclosed technologies may be integrated with many desktop publishing platforms or solutions, such as Photoshop, Illustrator, InDesign, etc., e.g., as a novel service for automatically generating layout variations.

Figure 1:
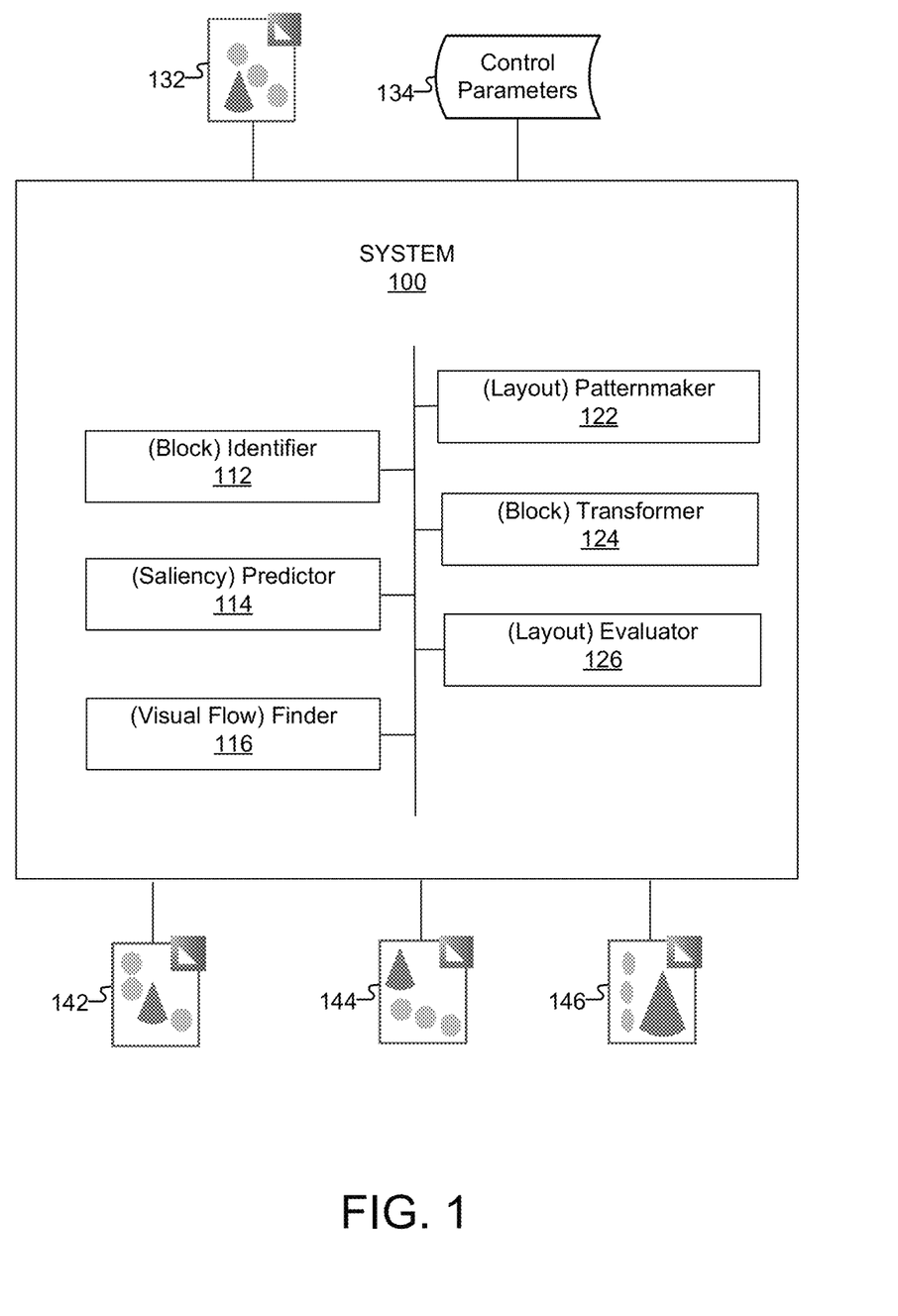
FIG. 1 is a schematic diagram of an exemplary system, in accordance with at least one aspect of the technologies described herein.

Having briefly described an overview of the technologies described herein, referring now to FIG. 1. The workflow related to system 100 is user friendly. From the user's perspective, the user first creates a graphic layout, layout 132, using some design assets. Next, the user may utilize system 100 to create different sized layout variations of layout 132, e.g., to publish layout 132 for different devices or mediums. To do that, the user may specify the output size and other user-controllable parameters (e.g., a granularity level for design blocks, the desired number of output layouts, etc.) in control parameters 134, so that system 100 can output various layout variations (e.g., layout 142, layout 144, or layout 146) based on control parameters 134. Typically, after specifying control parameters 134, the user may simply click on the "Create Alternate Layouts" button on a graphical user interface (GUI) to view or select alternative layout variations.

From the system's perspective, the process for layout generation may be divided into several stages, which is disclosed herein in connection with an overview of various components in system 100. First, identifier 112 is configured to identify design blocks in layout 132. A design block contains one or more semantically related elements, as illustrated in and further discussed with FIG. 2. System 100 can significantly reduce the computational complexity by using design blocks as basic units for visual flow, as layout 132 may have many design elements.

Next, in some embodiments, predictor 114 is configured to predict respective saliency measures of each pixel in layout 132. A saliency prediction model, e.g., based on neural networks, may be used to generate a heatmap of the image rendition of layout 132. The heatmap indicates pixel-wise saliency of the layout. In another embodiment, other types of neural networks are used by predictor 114 to predict respective saliency measures of each design element in layout 132.

Next, finder 116 is configured to determine the visual flow of the design blocks in layout 132. The visual flow represents the decreasing order of the visual importance of the design blocks in layout 132. In some embodiments, the visual importance score of a design block is determined based on the pixels within the design block and the heatmap, e.g., based on the average pixel saliency measures within the design block. The design blocks in layout 132 may be ranked or sorted based on their visual importance scores. Thus, the visual flow of the layout can be determined by traversing all design blocks in the decreasing order based on their ranks.

Figure 3:
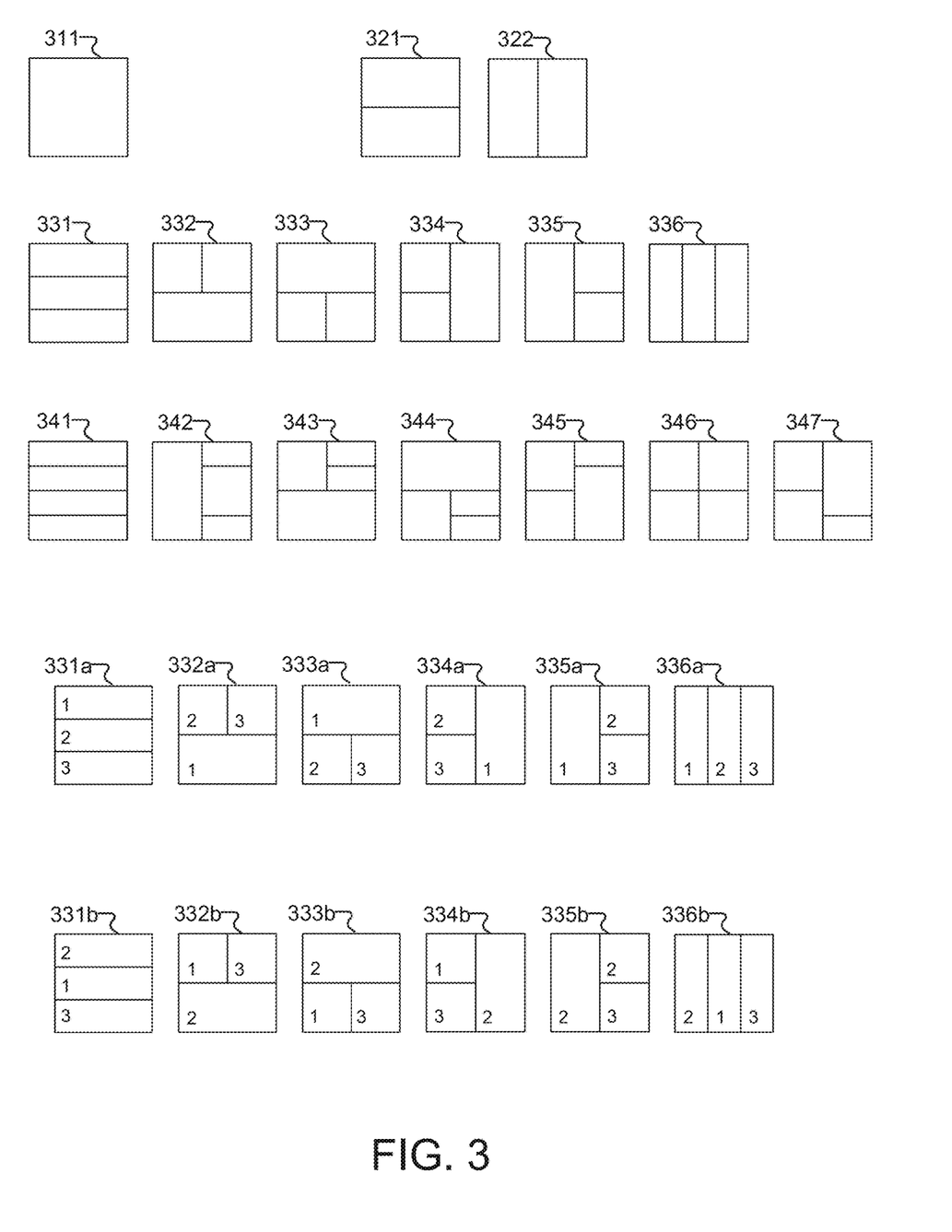
FIG. 3 is a schematic representation illustrating an exemplary process for selecting patterns and allotting sections, in accordance with at least one aspect of the technologies described herein.

Next, patternmaker 122 is configured to select suitable patterns based on the visual flow. Based on the layout output size and the number of design blocks, patternmaker 122 can potentially generate many design patterns to fit the design blocks in layout 132, as illustrated in FIG. 3. A design pattern (or pattern) has several sections, and the number of sections should be equal to the number of design blocks in layout 132, so that each design block may be allotted with a corresponding section. In various embodiments, patternmaker 122 allots sections of a pattern to the design blocks based on the visual flow of the design blocks, so that the output layout variation can have a consistent design as the input layout. Since there are many possible allotment variations, in some embodiments, patternmaker 122 will prune the allotment variations and select a finite list of allotted patterns to generate the output layout variations.

Next, transformer 124 is configured to transform the design blocks into a pattern based on the allotment schema, which defines a one-to-one relationship between a design block and a section of the pattern. The transformation may involve resizing, rescaling, repositioning, and reflowing of various elements in a design block. Various layout variations may be generated after the transformation step.

In some embodiments, evaluator 126 is configured to evaluate layout variations and select one or more highly ranked layout variations for final production or output according to various criteria, e.g., as discussed in connection with block 670 of FIG. 6. Additional details regarding the disclosed system and its processes will be discussed with reference to the subsequent figures.

Referring back to neural networks used in system 100, although a neural network may include any number of layers, for the purpose of illustration, a neural network may be described to have at least three operational layers, e.g., an input layer, a hidden layer, and an output layer. Each layer comprises neurons. The input layer neurons pass data to neurons in the hidden layer. Neurons in the hidden layer pass data to neurons in the output layer. The output layer then produces a classification, for example. Different types of layers and networks connect neurons in different ways. The objective of one type of layers (e.g., Convolutional, Relu, and Pool) is to extract features of the input volume, while the objective of another type of layer (e.g., Fully-connected and Softmax) is to classify based on the extracted features.

Neural networks with more than one hidden layer may be called deep neural networks. Examples of neural networks that may be used with aspects of the technology described herein include, but are not limited to, multi-layer perceptron (MLP) networks, convolutional neural networks (CNN), recursive neural networks, recurrent neural networks, and long short-term memory (LSTM) (which is a type of recursive neural network). Some embodiments described herein use a convolutional neural network, but aspects of the technology are applicable to other types of multi-layer machine classification technology.

Some layers may include parameters (e.g., weights or biases), such as a convolutional layer, while others may not, such as the ReLU layers and pooling layers. In various embodiments, the parameters may be learned or updated during training. Further, some of the layers may include additional hyper-parameters (e.g., learning rate, stride, epochs, kernel size, number of filters, type of pooling for pooling layers, etc.), such as a convolutional layer or a pooling layer, while other layers may not, such as a ReLU layer. Various activation functions may be used, including but not limited to, ReLU, leaky ReLU, sigmoid, hyperbolic tangent (tan h), exponential linear unit (ELU), etc. The parameters, hyper-parameters, or activation functions are not limited and may differ depending on the embodiment.

Although input layers, convolutional layers, pooling layers, ReLU layers, and fully connected layers are discussed herein, this is not intended to be limiting. For example, additional or alternative layers, such as normalization layers, softmax layers, or other layer types, may be used in a neural network.

Although some examples are described herein with respect to using neural networks, and specifically convolutional neural networks, this is not intended to be limiting. For example, and without limitation, system 100 may use any type of machine learning models, e.g., to predict the saliency measure of a pixel or a design element in layout 132, such as a machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

System 100 is merely one example of a suitable computing environment and is not intended to suggest any limitation on the scope of use or functionality of aspects of the technologies described herein. Neither should this system be interpreted as having any dependency or requirement relating to any one component nor any combination of components illustrated. It should be understood that each of the components shown in system 100 may be implemented on any type of computing device, such as computing device 700 described in FIG. 7. Different components in system 100 may be distributed to different physical devices. Further, a component may communicate with another component or various external devices via a network, which may include, without limitation, a local area network (LAN) or a wide area network (WAN).

It should be understood that this arrangement in system 100 is set forth only as an example. Other arrangements and elements (e.g., machines, networks, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combinations and locations. Further, various functions described herein as being performed by an entity may be carried out by hardware, firmware, or software. For instance, some functions may be carried out by a processor executing special instructions stored in memory, such as layout variation logic 722 of FIG. 7.

Figure 2:
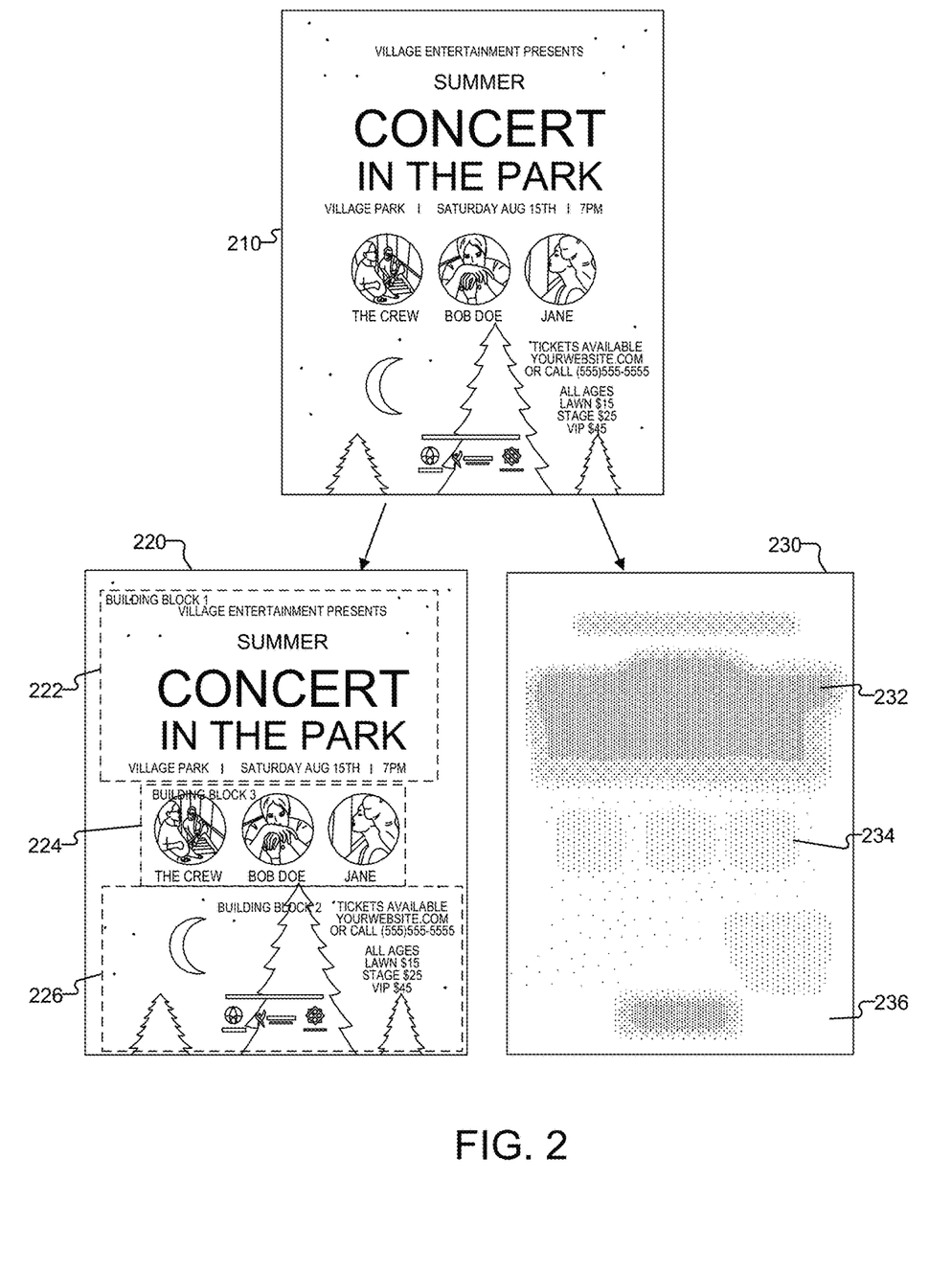
FIG. 2 is a schematic representation illustrating an exemplary process for identifying design blocks and generating a saliency heatmap, in accordance with at least one aspect of the technologies described herein.

Referring now to FIG. 2, which illustrates an exemplary process for identifying design blocks and generating a saliency heatmap. This exemplary process is to generate layout variations for a poster. There are many types of posters, such as movie posters, event posters, music group promotional posters, political posters, research posters, etc. Here, at stage 210, a poster has been designed to promote a concert. The poster includes both textual and graphic elements to be both eye-catching and informative, although other posters may be either wholly graphical or wholly text.

At stage 220, the process is to identify design blocks in the poster, e.g., design block 222, design block 224, and design block 226. Each design block may include a group of semantically related design elements, which should be repositioned or resized together in an output layout variation. In various embodiments, the page layout information and the bounding box metadata information of individual design elements are used to identify design blocks. A heuristic approach may be used to divide the layout into design blocks based on the metadata information of the layout or individual design elements. In one embodiment, the process is to assign two design elements into one design block based on an attribute shared in respective metadata of the two design elements. By way of example, the three design elements in design block 224 may share metadata of "performer," "band," etc. Accordingly, these elements may be grouped together as a design block. Further, information of the bounding boxes of these design elements may reveal that they share some common traits, such as the same size or the same alignment (e.g., aligned top or bottom). Accordingly, such bounding boxes information may also be used to group design elements that share one or more common features. In other embodiments, many other features of design elements may be used to infer their semantic connections.

Each design block is a basic unit to be transformed together into an output layout variation. In some embodiments, users may control the maximum number of design elements allowed in a design block (the "maximum threshold" hereinafter), e.g., by providing the maximum threshold via control parameters 134 in FIG. 1. In some embodiments, a system default maximum threshold may be set up, e.g., for each type of design. Generally, for complex designs, a larger maximum threshold may be used to control the complexity of the workflow. For simple designs, a smaller maximum threshold may be used to generate sufficient layout variations. For example, the maximum threshold of 5 is likely suitable for typical posters. In this way, by controlling the granularity level of the design blocks via the maximum threshold, the disclosed system can balance the complexity and variety of the output layout variations.

At stage 230, the process is to determine a visual flow of design blocks in the poster. The visual flow refers to an order of the design blocks, e.g., based on the respective visual importance of the design blocks. In various embodiments, given a graphic layout design, the disclosed system generates an image rendition of the layout and passes it through a saliency prediction model, which outputs a heatmap with pixel-wise saliency measures. For this poster, saliency measures of pixels in area 232 are generally higher than saliency measures of pixels in area 234. Similarly, saliency measures of pixels in area 234 are generally higher than saliency measures of pixels in area 236.

A saliency prediction model predicts the locations in an image that attract the attention of humans. The prediction is represented by a saliency heatmap, which contains the probability of each corresponding pixel in the image to capture human attention. In other words, each pixel is now associated with a saliency measure. In various embodiments, different saliency prediction models are used depending on the type of layout design. Some models require annotation of positions and importance scores of design elements or design blocks in training images. Subsequently, one or more neural networks are trained to predict visual saliency based on the annotated training images. Some models use end-to-end deep learning approaches for saliency prediction. These models predict saliency using a fully convolutional network (FCN) with pre-trained weights, e.g., obtained from semantic segmentation. Some models would also consider graphic design importance of various design elements in different types of layout designs in addition to natural image saliency. Some models try to balance the saliency between text and graphic elements. In short, depending on the design type, e.g., poster design, book cover design, webpage design, etc., different saliency prediction models may be trained and used at stage 230.

Next, the visual importance of a design block may be determined by correlating the saliency heatmap with design block information obtained at stage 220. In various embodiments, a representative characteristic of pixel-wise saliency measures in a design block is used to represent the overall importance of the design block. Depending on the practical application, the mean, the median, or the model of the pixel-wise saliency measures in a design block may be used as the representative characteristic. The mean is the average of pixel-wise saliency measures in the design block. The median is the middle value of pixel-wise saliency measures in the design block. The mode is the value that occurs most often among those pixel-wise saliency measures in the design block.

In some embodiments, a characteristic (e.g., the standard deviation) of the distribution of pixel-wise saliency measures is used to represent the importance of the design block. For example, a low standard deviation indicates the pixels in the design block are homogenous. In turn, the design block may be less important for lacking contrast or being dull. The inventors also contemplated using other types of measures, such as using respective pixel-wise saliency measures of a portion of the pixels in a design block to represent the importance of the design block. In one embodiment, only the top portion (e.g., top 10%, 15%, 20%, 25%, etc.) of pixels in a design block, ranked based on their respective saliency measures, are used to represent the importance of a design block. For this poster, the system inferred that design block 222 is visually more important than other design blocks, such as design block 224 or design block 226. Similarly, design block 226 is more important than design block 224.

Based on the visual importance information of design blocks and the design blocks information (e.g., boundaries, design elements, etc.), the disclosed system can rank design blocks in this poster and traverse these design blocks in an order (e.g., decreasing or increasing) based on their ranks. Accordingly, the visual flow may be determined by traversing the design blocks in the decreasing order of visual importance of these design blocks.

Figure 4:
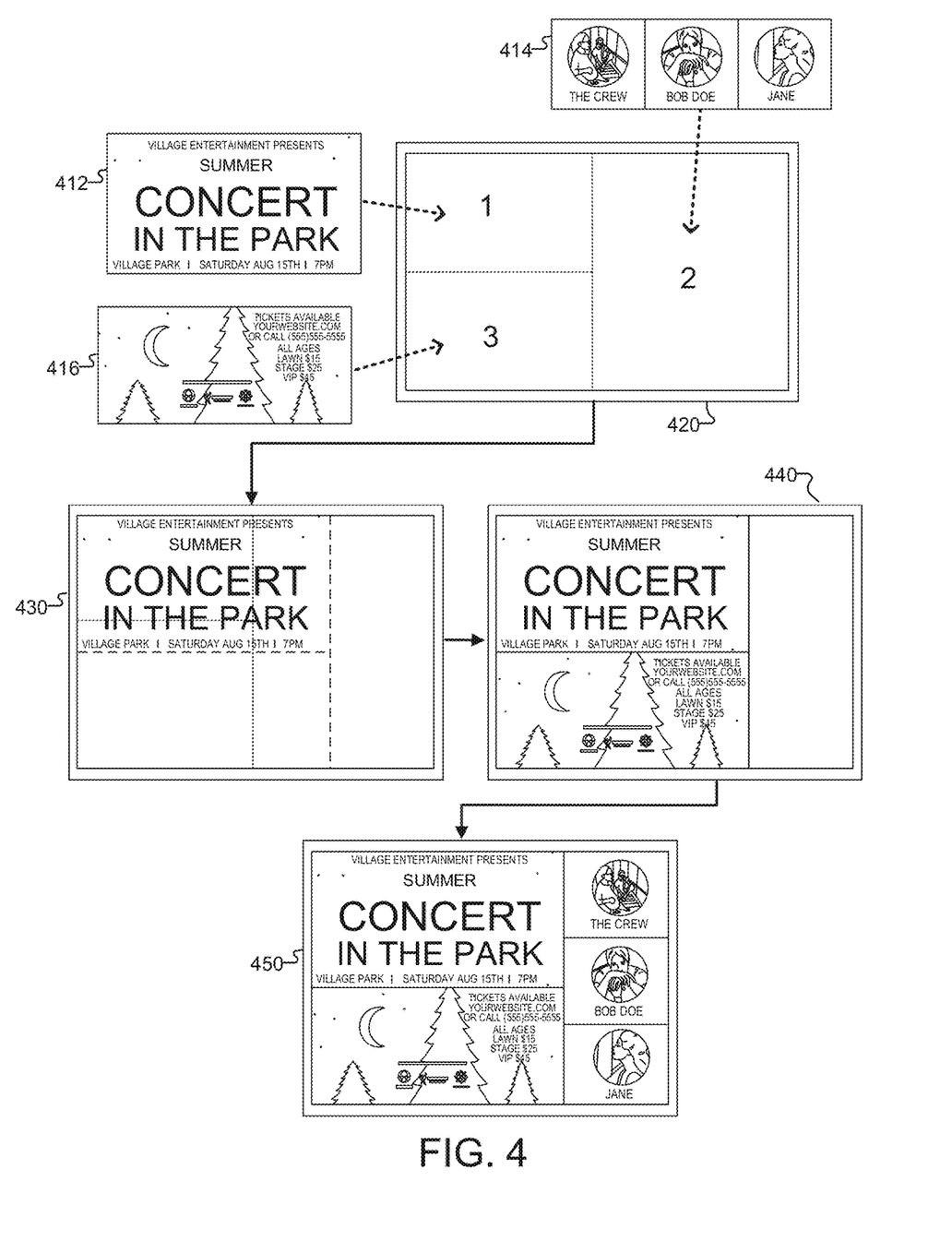
FIG. 4 is a schematic representation illustrating an exemplary process for adjusting a pattern and transforming design blocks, in accordance with at least one aspect of the technologies described herein.

Visual flow is the foundation of the pattern-making and transformation, as further discussed in FIG. 3 and FIG. 4. For example, by identifying the visual flow, the system now knows the relative importance of a design block compared to other design blocks. Based on the visual flow, the same relative importance may be configured for the same design block in a new layout variation, albeit with a different size or orientation. The new layout variation may retain the overall design concept, as presented in the original layout. Further, the visual flow also helps the system to score or rank various patterns that result from the permutations and combinations of the design blocks.

FIG. 3 illustrates an exemplary process for selecting patterns and allotting sections. At this point, the system has already gathered some information for generating layout variations, such as the output layout size, the visual flow, information of design blocks and their bounding box information, metadata of the input layout, design elements, etc. Next, the system will find a suitable pattern and allot sections in the pattern to design blocks.

The disclosed system generates template patterns based on exemplary designs with a certain size (or a range of sizes) and a certain number of sections. For example, pattern 311 has only one section. Pattern 321 and pattern 322 have two sections with respective arrangements, i.e., one being a horizontal configuration and the other being a vertical configuration. Patterns 331, 332, 333, 334, 335, and 336 have three sections. Patterns 341, 342, 343, 344, 345, 346, and 347 have four sections. As illustrated, each pattern provides its unique section-configuration. A skilled person may appreciate that pattern variations are not limited to the exemplary patterns illustrated in FIG. 3. Any other kind of patterns or templates (e.g., from Adobe Stock) can be input into this system. Alternatively, the system may generate new patterns based on a known pattern.

Next, the system will allot sections in a pattern to design blocks based on the visual flow. In one embodiment, sections in a pattern are allotted with respective visual flow ranks of the design blocks. The general principle is to match pattern sections with design blocks so that a prominent section is matched with a visually important design block.

Considering the case of three sections in a pattern, patterns 331*a*, 332*a*, 333*a*, 334*a*, 335*a*, and 336*a* illustrate one type of allotment. Similarly, patterns 331*b*, 332*b*, 333*b*, 334*b*, 335*b*, and 336*b* illustrate another type of allotment. As illustrated, different types of allotments may be generated based on the same visual flow. The number in each section indicates the relative position of the numbered design block. This number represents the rank of a particular design block in the visual flow. Lower rank corresponds to higher visual importance in this embodiment. Resultantly, each of the design blocks is allotted a section in the pattern according to the visual flow or the relative visual importance of the design block in the input layout as well as the output layout.

Many allotment variations can be generated based on permutations or combinations of the design blocks and the pattern sections. In some embodiments, the system will prune less-desirable allotments to reduce computational complexity. The pruning may be based on factors like the importance of a particular design block in the input design. The pruning may also be based on the likelihood of a particular design block to occupy a relatively prominent section in the pattern. For example, the allotment of putting "3" at the top section of pattern 331 may be pruned because putting the least important design block at the most prominent section would significantly alter the original layout design. For each remaining allotted pattern, each design block needs to be transformed into a corresponding section, which will be discussed next with FIG. 4.

FIG. 4 is a schematic representation illustrating an exemplary process for adjusting a pattern and transforming design blocks into the pattern. This process contains two main parts, namely fluidic pattern adjustment and final transformation application.

For an allotted pattern, the system uses the visual flow information to adjust a pattern (e.g., the demarcations), then to reposition, resize, rescale, or reflow individual design blocks or design elements to transform them into the pattern. Notably, the respective ranks of design blocks are used by the system to decide how to reposition, resize, rescale, or reflow a design block in the graphic design.

In this example, stage 420 represents an allotted pattern, which is dynamic and adjustable as the section demarcation lines are fluidic. The general aim is to transform design block 412 into section 1, design block 414 into section 2, and design block 416 into section 3.

In various embodiments, the system uses the visual flow information and the metadata of design blocks to adjust the allotted pattern. For example, at stage 430, the visual flow rank (i.e., #1) of design block 412 indicates that this block should be transformed into section 1. However, the metadata (e.g., the bounding box information) of design block 412 indicates its size is larger than section 1. In this case, the system will dynamically adjust the demarcation in this allotted pattern, e.g., to enlarge section 1. Here, stage 430 shows the adjustment of the fluidic demarcation lines from the original position to a new position calculated based on the metadata information of design block 412.

Reflow refers to break a design block into various design elements and rearrange them, e.g., in a different orientation. For example, after transforming design block 416 into section 3 at stage 440, design block 414 cannot be simply resized to fit into adjusted section 2 because their dimensional ratios are incompatible. Accordingly, at stage 450, the system reflows design block 414 into section 2. The decision of resizing or reflowing a design block is decided on the basis of a scoring function in some embodiments. The scoring function is based on the design elements within the design block, the change in the dimensional ratio of the design block in the pattern, etc. For example, if the dimensional ratio of the pattern does not change drastically or flip from horizontal to vertical or vice versa, resizing or rescaling a design block may be sufficient. However, if resizing alone is insufficient to transform every design block into the allotted pattern, the system may reflow design elements in one or more design blocks.

In one embodiment, once the demarcation lines are finalized for an allotted pattern, and the decisions for reflow or resize are made, a transform matrix is created for each of the design blocks. The transform matrix includes information on translation, scaling parameters of individual design elements, and what type of transformation is applied based on the type of the element (e.g., graphic, text, etc.). As a post-processing step, after applying the transform matrix, whitespace, the gap between blocks, etc. may be further adjusted depending upon their original relation in the input layout design.

Resultantly, a new layout variation is created. Comparing the input poster in FIG. 2 and the output poster in FIG. 4, a careful observer may have noticed that the system has automatically created a new landscape version of the poster from the portrait version of the poster by rearranging, resizing, or reflowing the design blocks. Advantageously, the system has kept the relative visual importance of design blocks consistent between both layouts. As an example, design block 222 of FIG. 2 is important in the portrait version of the poster; and design block 412 of FIG. 4 is similarly important in the landscape version of the poster. As another example, design block 222 of FIG. 2 has been reflowed to maintain its relative visual importance in FIG. 4.

Figure 5:
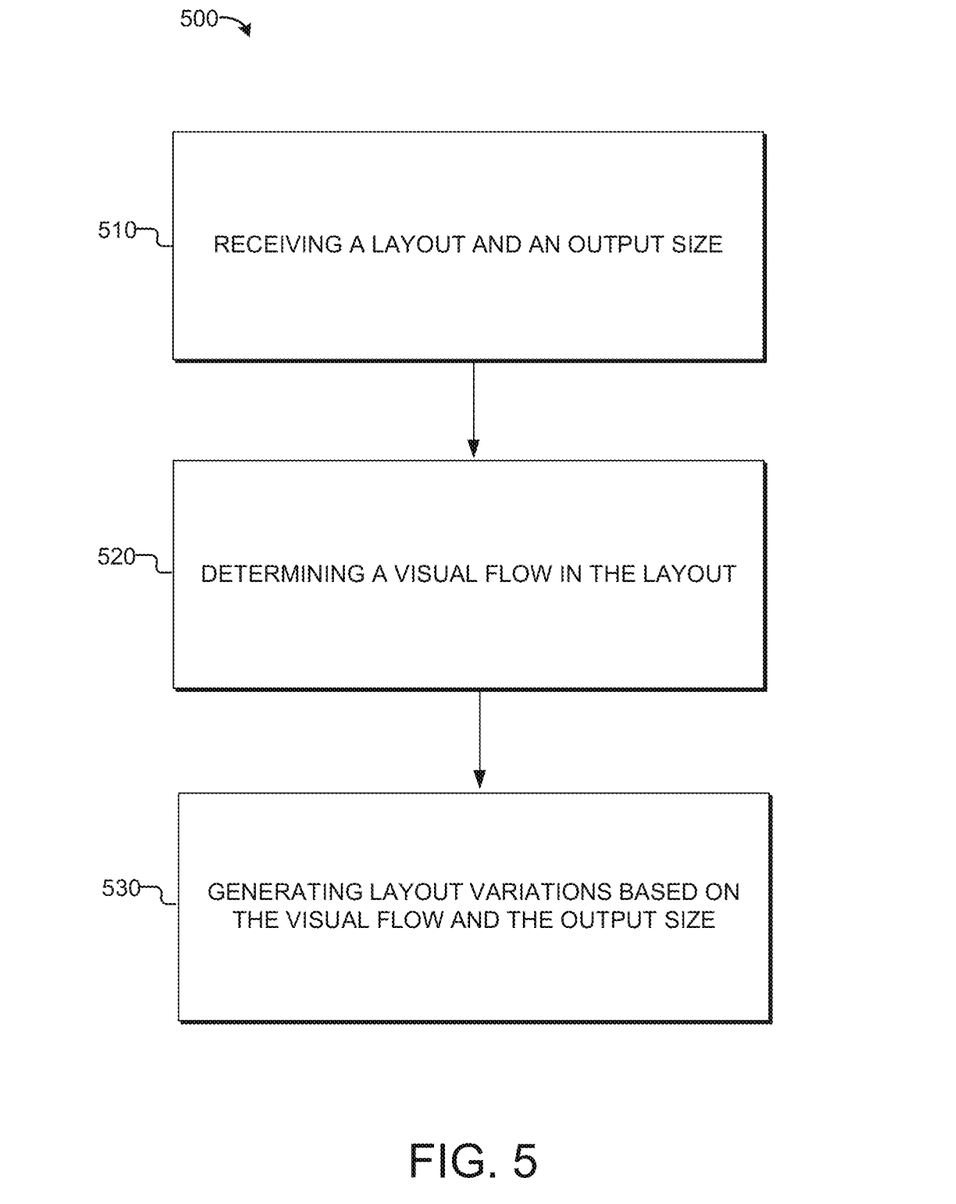
FIG. 5 is a flow diagram illustrating a first exemplary process of generating layout variations, in accordance with at least one aspect of the technologies described herein.

FIG. 5 is a flow diagram illustrating a first exemplary process of generating layout variations, e.g., performed by system 100 of FIG. 1. Each block of process 500, and other processes described herein, comprises a computing process that may be performed using any combination of hardware, firmware, or software. For instance, various functions may be carried out by a processor executing instructions stored in memory. The process may also be embodied as computer-usable instructions stored on computer storage media or devices. The process may be executed by a device, a standalone application or app, a computing service, or in any combinations thereof.

At block 510, the process is to receive a layout and an output size. In some embodiments, the process may additionally receive other user-controllable parameters, such as the maximum threshold, as discussed previously.

At block 520, the process is to determine a visual flow in the layout, such as discussed with FIG. 2. In various embodiments, the visual flow reflects the relative importance of design blocks in decreasing order. The importance measurement of a design block may be inferred from pixel-wise saliency measures of pixels inside the design block.

At block 530, the process is to generate layout variations based on the visual flow and the output size. In various embodiments, the system selects a suitable pattern based on the number of design blocks in the input layout, and allots sections in the pattern to design blocks based on the visual flow. Further, based on the visual flow and information of each design block, the system can adjust the allotted pattern and transform each design block into the adjusted pattern.

Process 500 may be applied recursively for a design. For example, users may designate a portion of the input layout to apply process 500 in some embodiments. To an extent, nested layout variations may be generated in relation to the designated portion of the input layout in the context of layout variation generation for the whole input layout. This feature is especially powerful in dividing and conquering intricate designs.

Figure 6:
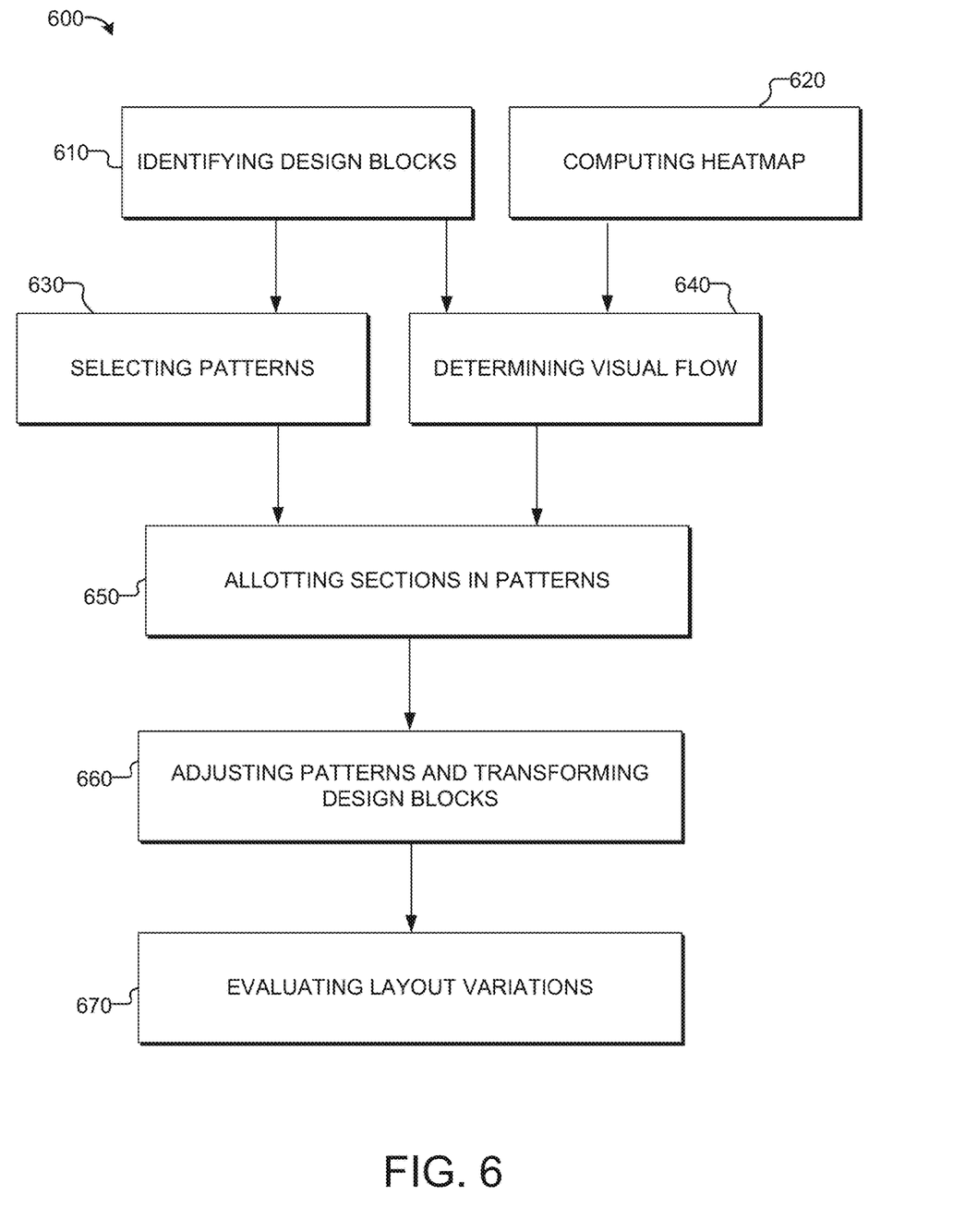
FIG. 6 is a flow diagram illustrating a second exemplary process of generating layout variations, in accordance with at least one aspect of the technologies described herein.

FIG. 6 is a flow diagram illustrating a second exemplary process of generating layout variations, e.g., performed by system 100 of FIG. 1. Each block of process 600, and other processes described herein, comprises a computing process that may be performed using any combination of hardware, firmware, or software. For instance, various functions may be carried out by a processor executing instructions stored in memory. The process may also be embodied as computer-usable instructions stored on computer storage media or devices. The process may be executed by a device, a standalone application or app, a computing service, or in any combinations thereof.

At block 610, the process is to identify design blocks. When there are a large number of elements in an input layout, the complexity for transforming elements individually to an output layout is very high. In order to manage the complexity associated with layout variation generation, the process is to divide the elements in the input layout into groups. Each group contains a set of semantically related elements. In various embodiments, the process is to identify such semantic-relatedness via metadata of design elements or the input layout. For example, two design elements may be heuristically grouped together if they share one or more features (e.g., keywords, boundary connections, etc.) in their metadata.

In some embodiments, certain user control functions are provided via a graphic user interface. A user may assign or reassign a design element to a design block, e.g., by a drag-and-drop operation or by adjusting the boundary lines of the design block. Conversely, the user may also remove a design element from a design block, e.g., by a drag-and-drop operation or by adjusting the boundary lines of the design block.

At block 620, the process is to compute a heatmap. In one embodiment, the input layout is sent to a backend tensor-flow based machine learning model for inferencing a pixel-wise saliency heatmap, which contains pixel-wise saliency measures or scores. This heatmap can be used to determine the visual importance of respective design blocks, and subsequently the visual flow of the design blocks. In one embodiment, the saliency prediction model outputs an element-wise saliency heatmap, in which every design element (e.g., a graphic element, a text string, etc.) is associated with a saliency score.

At block 630, the process is to select patterns, e.g., based on the number of design blocks in the input layout. In some embodiments, the process simply selects a number of random patterns from a pattern pool. Each selected pattern should have the same number of sections. In some embodiments, patterns in the pattern pool are ranked, e.g., based on user rankings or a particular user's preference. Additionally, the desired number of output layout variations may be provided in control parameters 134 in FIG. 1. Accordingly, the process selects top-ranked patterns from the ranked pattern pool based on the desired number of output layout variations. In some embodiments, based on the number of design blocks and the output layout size, the process can dynamically generate various patterns with the same number of sections via a generative adversarial network (GAN), e.g., based on known exemplary patterns.

At block 640, the process is to determine a visual flow of the design blocks. In some embodiments, the process is to derive the visual importance of a design block from a normalized measurement of the pixel-wise or the element-wise saliency measures in the design block. The normalized measurement may include the mean, the median, or the model of relevant pixel-wise or element-wise saliency measures. Resultantly, each design block is represented by a single normalized importance score. Accordingly, the design blocks can be ranked or sorted based on their importance scores. The visual flow of the design blocks is obtained by traversing these design blocks in decreasing order of their respective ranks or importance scores. In some embodiments, user control functions are provided to let users adjust the ranking of a design block or reorder the visual flow, e.g., via a drag-and-drop operation on a visible ranking list or via other means.

At block 650, the process is to allot sections in a pattern, e.g., as previously discussed in FIG. 3. An allotted pattern contains several allotted sections. The allotted number to a section corresponds to a particular rank in the visual flow, so that each section is uniquely mapped to a design block based on the visual flow.

At block 660, the process is to adjust the pattern and transform design blocks, e.g., as previously discussed in FIG. 4. In various embodiments, the process is first to rescale the pattern based on the output layout size. Next, information of design blocks and the visual flow are used to adjust the pattern (e.g., enlarge or shrink a section by adjusting the demarcation lines) and transform (e.g., resize, rescale, reflow, etc.) design blocks into respective sections in the adjusted pattern. In some embodiments, if the size (e.g., the width, the height, the dimensional ratio) of the target section in the pattern is significantly different from the corresponding size of the design block, which may be determined based on metadata of the design elements in the design block, the design elements in the design block are reflowed to fit into the target section. In some embodiments, if the reflow score of a design block is less than a threshold, the design block is rescaled; otherwise, the design block is reflowed to fit into its corresponding section in the pattern. Accordingly, a new layout variation is generated.

At block 670, the process is to evaluate layout variations. In some embodiments, the layout variations are further sorted based on the score calculated using a heuristic function involving the visual importance ranking along with aesthetic parameters like balance, symmetry, etc. In some embodiments, the top-ranked layouts are selected and again reordered according to the proximity of the importance score of design element groups in the input layout and the output layout.

The evaluation function is the cumulative evaluation of a given layout, taking into consideration various parameters, such as the wireframing, bounding boxes, layout boxes of its items, various layout design parameters, the visual flow importance comparison among the elements in the input layout and the created variation, etc.

One evaluation parameter is balance, which can be defined as the distribution of optical weight in a layout. Optical weight refers to the perception that some objects appear heavier than others. Larger objects are heavier, whereas small objects are lighter. Balance in layout design is achieved by providing an equal weight of screen elements, left and right, top, and bottom. In some embodiments, balance is computed as the difference between total weighting of components on each side of the horizontal and vertical axis and is given by the following equations. In these equations, $BM_{vertical}$ and $BM_{horizontal}$ are, respectively, the vertical and horizontal balances; L, R, T, and B stand for left, right, top, and bottom, respectively; $w_j$ is the total weight of side j; $a_{ij}$ is the area of object i on side j; $d_{ij}$ is the distance between the center lines of the object and the frame; and, $n_j$ is the total number of objects on the side.

$$BM = 1 - \frac{|BM_{vertical}| + |BM_{horizontal}|}{2}$$

$$BM_{vertical} = \frac{w_L - w_R}{\max(|w_L|, |w_R|)}$$

$$BM_{horizontal} = \frac{w_T - w_B}{\max(|w_T|, |w_B|)}$$

$$w_j = \sum_i^n a_{ij} d_{ij} \quad j = L, T, R, B$$

Another evaluation parameter is density, which is the extent to which the layout is covered with objects. Density is achieved by restricting screen density levels to an optimal percentage. A measure of density is the percentage of item positions on the entire frame containing the content. This measure can be obtained with the following equation in some embodiments, where $a_i$ and $a_{frame}$ are the areas of object i and the frame; and, n is the number of objects on the frame. Assume that the optimum layout density level for graphic layouts is 50%.

$$DM = 1 - 2\left|0.5 - \frac{\sum_i^n a_i}{a_{frame}}\right|$$

Another evaluation parameter is equilibrium, which refers to stabilization or a midway center of suspension. Equilibrium on a layout is accomplished through centering the layout itself. The center of the layout coincides with that of the content frame. Equilibrium may be computed as the difference between the center of mass of the displayed elements and the physical center of the screen, e.g., via the following equations. The equilibrium components along the x-axis ($EM_x$) and y-axis ($EM_y$) may also be obtained, where ($x_i$; $y_i$) and ($x_c$; $y_c$) are the coordinates of the centers of object i and the frame; $a_i$ is the area of the object; $b_{frame}$ and $h_{frame}$ are the width and height of the frame; and n is the number of objects on the frame.

$$EM = 1 - \frac{|EM_x| + |EM_y|}{2}$$

$$EM_x = \frac{2\sum_i^n a(x_i - x_c)}{b_{frame}\sum_i^n a_i}$$

$$EM_y = \frac{2\sum_i^n a(y_i - y_c)}{h_{frame}\sum_i^n a_i}$$

The inventors have contemplated using other evaluation parameters in other embodiments, including symmetry, sequence, cohesion, unity, homogeneity, proportion, simplicity, regularity, economy, rhythm, etc. The result of block 670 is a ranked layout variation, so that the system may optionally only output top-ranked layout variations to users.

Accordingly, various aspects of the technologies for generating layout variations have been disclosed herein. It is understood that various features, sub-combinations, and modifications of the embodiments described herein are of utility and may be employed in other embodiments without reference to other features or sub-combinations. Moreover, the order and sequences of steps/blocks shown in the above example processes are not meant to limit the scope of the present disclosure in any way, and in fact, the steps/blocks may occur in a variety of different sequences within embodiments hereof. Such variations and combinations thereof are also contemplated to be within the scope of embodiments of this disclosure.

Figure 7:
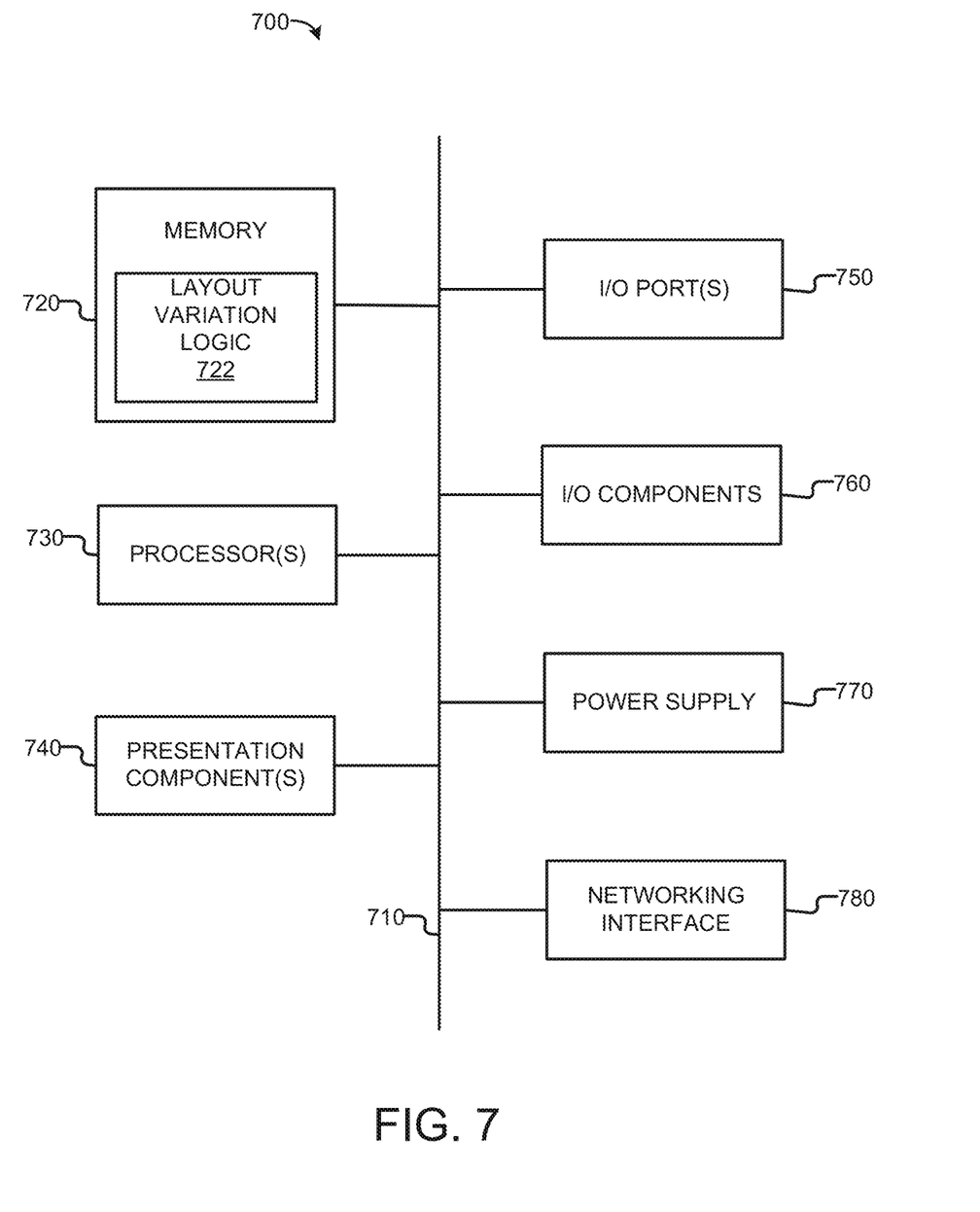
FIG. 7 is a block diagram of an exemplary computing environment suitable for implementing various aspects of the technologies described herein.

Referring to FIG. 7, an exemplary operating environment for implementing various aspects of the technologies described herein is shown and designated generally as computing device 700. Computing device 700 is but one example of a suitable computing environment and is not intended to suggest any limitation as to the scope of use of the technologies described herein. Neither should the computing device 700 be interpreted as having any dependency or requirement relating to any one or combination of components illustrated.

The technologies described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technologies described herein may be practiced in a variety of system configurations, including handheld devices, consumer electronics, general-purpose computers, and specialty computing devices, etc. Aspects of the technologies described herein may also be practiced in distributed computing environments where tasks are performed by remote processing devices that are connected through a communications network.

With continued reference to FIG. 7, computing device 700 includes a bus 710 that directly or indirectly couples the following devices: memory 720, processors 730, presentation components 740, input/output (I/O) ports 750, I/O components 760, and an illustrative power supply 770. Bus 710 may include an address bus, data bus, or a combination thereof. Although the various blocks of FIG. 7 are shown with lines for the sake of clarity, delineating various components is not so clear in various embodiments, and metaphorically, the lines would more accurately be grey and fuzzy. For example, one may consider a presentation component such as a display device to be an I/O component. The inventors hereof recognize that such is the nature of the art and reiterate that the diagram of FIG. 7 is merely illustrative of an exemplary computing device that can be used in connection with different aspects of the technologies described herein. The distinction is not made between such categories as "workstation," "server," "laptop," "handheld device," etc., as all are contemplated within the scope of FIG. 7 and refers to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technologies for storage of information such as computer-readable instructions, data structures, program modules, or other data.

Computer storage media includes RAM, ROM, EEPROM, flash memory or other memory technologies, CD-ROM, digital versatile disks (DVD) or other optical disk storage, magnetic cassettes, magnetic tape, magnetic disk storage or other magnetic storage devices. Computer storage media does not comprise a propagated data signal. A computer-readable device or a non-transitory medium in a claim herein excludes transitory signals.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 720 includes computer storage media in the form of volatile and/or nonvolatile memory. The memory 720 may be removable, non-removable, or a combination thereof. Exemplary memory includes solid-state memory, hard drives, optical-disc drives, etc. Computing device 700 includes processors 730 that read data from various entities such as bus 710, memory 720, or I/O components 760. Presentation component(s) 740 present data indications to a user or another device. Exemplary presentation components 740 include a display device, speaker, printing component, vibrating component, etc. I/O ports 750 allow computing device 700 to be logically coupled to other devices, including I/O components 760, some of which may be built-in.

In various embodiments, memory 720 includes, in particular, temporal and persistent copies of layout variation logic 722. Layout variation logic 722 includes instructions that, when executed by processor 730, result in computing device 700 performing functions, such as but not limited to, process 500, process 600, or their sub-processes. In various embodiments, layout variation logic 722 includes instructions that, when executed by processors 730, result in computing device 700 performing various functions associated with, but not limited to various components in connection with system 100 in FIG. 1, such as identifier 112, predictor 114, finder 116, patternmaker 122, transformer 124, or evaluator 126.

In some embodiments, processors 730 may be packed together with layout variation logic 722. In some embodiments, processors 730 may be packaged together with layout variation logic 722 to form a System in Package (SiP). In some embodiments, processors 730 can be integrated on the same die with layout variation logic 722. In some embodiments, processors 730 can be integrated on the same die with layout variation logic 722 to form a System on Chip (SoC).

Illustrative I/O components include a microphone, joystick, gamepad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 730 may be direct or via a coupling utilizing a serial port, parallel port, system bus, or other interface known in the art. Furthermore, the digitizer input component may be a component separate from an output component, such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technologies described herein.

I/O components 760 include various GUIs, which allow users to interact with computing device 700 through graphical elements or visual indicators, such as various graphical elements illustrated in FIGS. 2-4. Interactions with a GUI are usually performed through direct manipulation of graphical elements in the GUI. Generally, such user interactions may invoke the business logic associated with respective graphical elements in the GUI. Two similar graphical elements may be associated with different functions, while two different graphical elements may be associated with similar functions. Further, the same GUI may have different presentations on different computing devices, such as based on the different graphical processing units (GPUs) or the various characteristics of the display.

Computing device 700 may include networking interface 780. The networking interface 780 includes a network interface controller (NIC) that transmits and receives data. The networking interface 780 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 780 may include a wireless terminal adapted to receive communications and media over various wireless networks. Computing device 700 may communicate with other devices via the networking interface 780 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technologies described herein have been described in relation to particular aspects, which are intended in all respects to be illustrative rather than restrictive. While the technologies described herein are susceptible to various modifications and alternative constructions, certain illustrated aspects thereof are shown in the drawings and have been described above in detail. It should be understood, however, that there is no intention to limit the technologies described herein to the specific forms disclosed, but on the contrary, the intention is to cover all modifications, alternative constructions, and equivalents falling within the spirit and scope of the technologies described herein.

What is claimed is:

1. A non-transitory computer-readable storage device encoded with instructions that, when executed, cause a computing system to perform operations of image processing, comprising:
  receiving an input comprising a first layout in a first layout size;
  applying a saliency prediction model to the first layout to generate a pixel-wise heatmap of the first layout;
  identifying a plurality of design blocks in the first layout, a design block of the plurality of design blocks including a plurality of design elements;
  computing respective normalized importance scores for each of the plurality of design blocks based on the pixel-wise heatmap of the first layout;
  determining a visual flow of the plurality of design blocks in the first layout based on the respective normalized importance scores for each of the plurality of design blocks by determining a descending order of the plurality of design blocks based on the respective normalized scores of the plurality of design blocks; and
  generating an output comprising a second layout in a second layout size based on the visual flow of the plurality of design blocks in the first layout;
  wherein the second layout comprises a layout variation of the plurality of design elements of the plurality of design blocks of the first layout.

2. The computer-readable storage device of claim 1, wherein the pixel-wise heatmap contains respective saliency scores of pixels in the first layout to capture human attention.

3. The computer-readable storage device of claim 1, wherein identifying the plurality of design blocks comprises identifying a design block of the plurality of design blocks based on respective metadata of the plurality of design elements.

4. The computer-readable storage device of claim 1, the operations of image processing further comprising: wherein determining the visual flow comprises:
  using the descending order of the plurality of design blocks as the visual flow.

5. A non-transitory computer-readable storage device encoded with instructions that, when executed, cause a computing system to perform operations of image processing, comprising:
  receiving an input comprising a first layout in a first layout size;
  receiving an output size for a second layout
  applying a saliency prediction model to the first layout to generate a pixel-wise heatmap of the first layout;
  identifying a plurality of design blocks in the first layout, a design block of the plurality of design blocks including a plurality of design elements;
  computing respective importance scores for each of the plurality of design blocks based on the pixel-wise heatmap of the first layout;
  determining a visual flow of the plurality of design blocks in the first layout based on the respective importance scores for each of the plurality of design blocks;
  generating an allotted pattern for the second layout based on the output size and a total number of design blocks in the first layout, wherein the allotted pattern comprises a plurality of ordered sections; and generating an output comprising the second layout in a second layout size based on the visual flow of the plurality of design blocks in the first layout;

wherein the second layout comprises a layout variation of the plurality of design elements of the plurality of design blocks of the first layout.

6. The computer-readable storage device of claim 5, wherein the instructions that, when executed, further cause the computing system to perform operations comprising:

matching, based on the visual flow of the plurality of design blocks, the plurality of design blocks with the plurality of ordered sections of the allotted pattern; and transforming the plurality of design blocks into the plurality of ordered sections.

7. The computer-readable storage device of claim 6, wherein the transforming comprises adjusting, based on a size of a design block of the plurality of design blocks, a demarcation of the allotted pattern.

8. The computer-readable storage device of claim 6, wherein the transforming comprises reflowing, based on a first size of a section of the allotted pattern and a second size of the design block of the plurality of design blocks, the plurality of design elements in the design block.

9. A computer-implemented method for image processing, comprising:

inputting a first layout comprising a first layout size;

identifying a plurality of design blocks in the first layout based on metadata of a plurality of design elements in the first layout, wherein a design block of the plurality of design blocks includes one or more design elements of the plurality of design elements in the first layout;

determining a visual flow of the plurality of design blocks based on respective importance scores for each of the plurality of design blocks in the first layout;

generating a plurality of layout variations based on the visual flow of the plurality of design blocks in the first layout, wherein the plurality of layout variations each comprise a layout variation of the plurality of design elements of the plurality of design blocks of the first layout;

allotting, based on the visual flow, a plurality of sections in a pattern to the plurality of design blocks in the first layout;

resealing the pattern based on an output size of the plurality of layout variations;

determining a first size of a section in the pattern, the section being allotted to a design block of the plurality of design blocks;

determining a second size of the design block of the plurality of design blocks based on metadata of the plurality of design elements in the design block; and reflowing, based on a comparison between the first size and the second size, the plurality of design elements in the design block to fit the plurality of design elements into the section in the pattern.

10. The method of claim 9, further comprising:

assigning two design elements into one design block of the plurality of design blocks based on an attribute shared in respective metadata of the two design elements.

11. The method of claim 9, wherein determining the visual flow comprises:

computing, based on a saliency prediction model, a pixel-wise heatmap of the layout wherein each pixel of the layout is associated with a saliency score;

calculating respective normalized scores for the plurality of design blocks based on respective saliency scores of pixels in respective design blocks of the plurality of design blocks; and sorting respective normalized scores of design blocks to determine the visual flow.

12. The method of claim 9, further comprising:

rescaling the pattern based on an output size of the plurality of layout variations; and rescaling one or more design blocks of the plurality of design blocks to fit the plurality of design blocks into the plurality of sections in the pattern.

13. The method of claim 9, further comprising:

determining a size of the design block of the plurality of design blocks based on metadata of the one or more design elements in the design block; and adjusting, based on the size of the design block, one or more demarcations in the pattern to redefine a boundary of a section allotted to the design block.

14. The method of claim 9, further comprising:

ranking the plurality of layout variations based on a balance measure, a density measure, or an equilibrium measure; and causing display of one or more top-ranked layouts from the plurality of layout variations.

* * * * *

UNITED STATES PATENT AND TRADEMARK OFFICE
CERTIFICATE OF CORRECTION

PATENT NO. : 11,449,662 B2
APPLICATION NO. : 17/068623
DATED : September 20, 2022
INVENTOR(S) : Amish Kumar Bedi et al.

It is certified that error appears in the above-identified patent and that said Letters Patent is hereby corrected as shown below:

In the Claims

Claim 4, Column 18, Line 44:
The line reading "operations of image processing further comprising: wherein" should read
-- operations of image processing further comprising: --.

Claim 4, Column 18, Line 45:
Delete the line reading "determining the visual flow comprises:".

Claim 5, Column 18, Line 54:
The line reading "receiving an output size for a second layout" should read -- receiving an output size for a second layout; --.

Claim 9, Column 19, Line 46:
The line reading "resealing the pattern based on an output size of the" should read -- rescaling the pattern based on an output size of the --.

Signed and Sealed this
Eighth Day of November, 2022

Katherine Kelly Vidal
*Director of the United States Patent and Trademark Office*